United States Patent
Smook

(10) Patent No.: US 9,845,865 B2
(45) Date of Patent: Dec. 19, 2017

(54) FIXATION OF PLANETARY BEARINGS

(71) Applicants: ZF Friedrichshafen AG, Friedrichshafen (DE); ZF WIND POWER ANTWERPEN N.V., Lommel (BE)

(72) Inventor: Warren Smook, Huldenberg (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 15/160,139

(22) Filed: May 20, 2016

(65) Prior Publication Data

US 2016/0363212 A1  Dec. 15, 2016

(30) Foreign Application Priority Data

Jun. 11, 2015  (DE) .................. 10 2015 210 684

(51) Int. Cl.
*F16H 57/08* (2006.01)
*F16H 1/28* (2006.01)

(52) U.S. Cl.
CPC ............. *F16H 57/082* (2013.01); *F16H 1/28* (2013.01); *F16H 2057/085* (2013.01)

(58) Field of Classification Search
CPC ....................................................... F16H 1/28
USPC ........................................................ 475/348
See application file for complete search history.

(56) References Cited

U.S. PATENT DOCUMENTS

| | | | |
|---|---|---|---|
| 2,044,203 A * | 6/1936 | Boykin, Jr. ............... | E21B 3/04 475/343 |
| 8,029,407 B2 | 10/2011 | Woo | |
| 2006/0035746 A1 | 2/2006 | Griggs et al. | |
| 2009/0163316 A1 | 6/2009 | Saenz de Ugarte et al. | |
| 2013/0217535 A1 | 8/2013 | Suzuki et al. | |

FOREIGN PATENT DOCUMENTS

| DE | 10 2008 007 644 A1 | 4/2009 |
|---|---|---|
| GB | 2 514 167 A | 11/2014 |

OTHER PUBLICATIONS

German Search Report Corresponding to 10 2015 210 684.5 dated Feb. 17, 2016.

* cited by examiner

*Primary Examiner* — Derek D Knight
(74) *Attorney, Agent, or Firm* — Davis & Bujold, PLLC; Michael J. Bujold

(57) ABSTRACT

A transmission (101) with at least one planetary carrier (102), at least one ring gear (103), at least one planetary gearwheel (105), at least one planetary bolt (107), one or more planetary bearings (109) and at least one sun gear (111). The planetary bolt (107) is fixed into the planetary carrier (102). The planetary gearwheel (105) is mounted to rotate on the planetary bolt (107) by way of the planetary bearing (109). The planetary gearwheel (105) meshes with the ring gear (103) and/or the sun gear (111). The transmission (101) includes at least one nut (123). The nut (123) screws onto an external thread (121) of the planetary bolt (107). The planetary bearings (109) are axially fixed by the nut (123) and a shoulder (125) of the planetary bolt (107).

5 Claims, 3 Drawing Sheets

FIXATION OF PLANETARY BEARINGS

This application claims priority from German patent application serial no. 10 2015 210 684.5 filed Jun. 11, 2015.

FIELD OF THE INVENTION

The invention concerns a transmission.

BACKGROUND OF THE INVENTION

Such transmissions are used in drive-trains of a wind power plant, in particular to transmit power of at least 1 MW. For this, the blades of a rotor exposed to wind drive an input shaft, which is connected in a rotationally fixed manner to a planetary carrier mounted so that it can rotate. On the planetary carrier are attached planetary bolts, on each of which a planetary gearwheel is mounted to rotate. The planetary gearwheels mesh with a rotationally fixed ring gear and/or a rotating sun gear.

The planetary gearwheels can rotate on the planetary bolts by virtue of so-termed planetary bearings. These are axially fixed on one side by the planetary carrier and on the other side by a shoulder of the planetary bolt. The distance of the shoulder from the face of the planetary carrier opposite it defines the axial play or prestressing of the planetary bearing.

To ensure a constant axial play or a constant prestressing even under load, the planetary bolts have to be fixed in the planetary carrier in such manner that even under load no displacement takes place, The planetary bolts are usually shrink-fitted into the planetary carrier. To ensure that the frictional holding force between the planetary bolts and the planetary carrier can bear loads to the extent required, the planetary carrier has to be strongly heated. For this, temperatures higher than 100 degrees are usual. That is not only expensive in energy terms, but also entails a high risk of injury for the fitter assembling the unit.

Furthermore, the connection between the planetary carrier and the planetary bolts must be of sufficient size. The material needed for this increases the costs and takes up fitting space.

SUMMARY OF THE INVENTION

The purpose of the present invention is to provide a transmission of the type mentioned at the start, while avoiding the drawbacks inherent in the solutions known from the prior art. In particular, the transmission should be easier to assemble and should be capable of standing higher loads, despite the use of less material.

This objective is achieved by a transmission and a method as described and claimed below.

The transmission comprises at least one planetary carrier, preferably mounted so that it can rotate, at least one ring gear, preferably arranged in a rotationally fixed manner and secured in a rotationally fixed supporting structure, at least one planetary gearwheel, at least one planetary bolt, one or more planetary bearings, and at least one, preferably rotationally mounted sun gear, The supporting structure can perhaps be a transmission housing.

The planetary bolts are fixed in the planetary carrier, By virtue of this fixing, the axial position of the planetary bolts relative to the planetary carrier is set. Moreover, the planetary bolts are preferably also attached in a rotationally fixed manner relative to the planetary carrier. In that case there is a solid connection between the planetary bolts and the planetary carrier, which allows no relative movements. In this context axial, means parallel to an axis of symmetry of the planetary bolt concerned.

Each planetary gearwheel is mounted to rotate on a respective planetary bolt by means of one or more planetary bearings. In particular the planetary gearwheel can be mounted in each case on two planetary bearings. The planetary gearwheel can rotate relative to the planetary bolt and hence to the planetary carrier, and also relative to the above-mentioned rotationally fixed protective structure.

The planetary gearwheel meshes with the ring gear and/or the sun gear. In a simple minus-planetary gearset the planetary gearwheel meshes with the ring gear and with the sun gear. In the case of a plus planetary gearset the planetary gearwheel meshes with the ring gear and with a further planetary gearwheel, which latter meshes with the sun gear, or the planetary gearwheel meshes with the sun gear and a further planetary gearwheel, which meshes with the ring gear.

According to the invention, the transmission has at least one nut, In a general sense a nut denotes a fixing means having an internal thread. The nut is screwed onto an external thread of the planetary bolt. The internal thread of the nut and the external thread of the planetary bolt form a matching pair of threads.

The planetary bolt is formed with a shoulder. This is a radially extending surface, i.e. one that is directed perpendicularly to the axis of symmetry of the planetary bolt. The shoulder and the nut screwed onto the external thread of the planetary bolt, axially fix the planetary bearing by which the planetary gearwheel is mounted on the planetary bolt. Thus, the shoulder and the nut limit the mobility of the planetary bearing in the axial direction, i.e. in the direction of the axis of symmetry of the planetary bolt. The nut and the shoulder each form a respective axial abutment. Thanks to the nut the axial mobility of one of the planetary bearings in a first axial direction is restricted. The shoulder restricts the mobility of the planetary bearing in a second axial direction opposite to the first axial direction.

The planetary bearings preferably determine the axial mobility of the planetary gearwheel. Thus, by virtue of the nut and shoulder, not only is the axial mobility of the planetary bearing determined, but also indirectly the axial mobility of the planetary gearwheel.

The axial mobility is limited by a contact surface of the nut, which can come into contact with a corresponding surface of one of the planetary bearings, Likewise, to limit the axial mobility the shoulder of the planetary bolt can come into contact with a corresponding surface of one of the planetary bearings.

The contact surface of the nut and the shoulder of the planetary bolt preferably face toward one another. Thus, in the axial direction the planetary bearing and the planetary gearwheel are located at least partially between the contact surface and the shoulder.

The planetary bolt is preferably fixed in a first bolt seat and a second bolt seat in the planetary carrier. The first and second bolt seats are outside an intermediate space between the contact surface of the nut and the shoulder of the planetary bolt. Axially therefore, the contact surface of the nut and the shoulder are positioned between the first bolt seat and the second bolt seat.

Furthermore, the planetary bolt, the nut and its internal thread and contact surface, the planetary bearing, the planetary gearwheel and where relevant the first bolt seat and the second bolt seat are arranged coaxially. This means that a central axis of the nut, the contact surface and the internal thread of the nut, the axis of symmetry of the planetary bolt and the rotation axes of the planetary bearing and the planetary gearwheel are all coincident.

By turning the nut relative to the planetary bolt, the distance of the nut and hence the distance from its contact surface to the shoulder of the planetary bolt changes. This also varies the axial play of the bearing or its prestressing. By using a spacer positioned between the planetary bearings, the planetary bearings can be prestressed by turning the planetary bolt relative to the planetary carrier toward the spacer. By varying the width of the spacer, a defined axial play or a defined prestress can be set.

In particular, the axial play or the prestressing or bracing of the planetary bearing is independent of the position of the planetary bolt relative to the planetary carrier. An axial displacement of the planetary bolt in the planetary carrier does not change the axial play, prestressing or bracing of the planetary bearing. Thus, less strict demands are made on the fixing of the planetary bolts in the planetary carrier. This enables the temperature to which the planetary carrier is heated for the fitting of the planetary bolts to be lower, the areas around the bolt seats to be reduced in size, and/or the planetary bolts to be fixed in some other way. For example, it may be possible to fix the planetary bolts with a retaining ring alone.

The arrangement described is particularly advantageous when conical roller bearings are used for the planetary bearings.

In a preferred further development, the transmission comprises at least one pin and at least one recess. A recess is understood to mean a hole or a depression. Preferably, the recess is a bore, i.e. a hole with a circular cross-section. Either the nut has the pin and the planetary carrier has the recess, or the nut has the recess and the planetary carrier has the pin. The pin engages in the recess, to ensure that the nut is secured against rotating relative to the planetary carrier.

Such a further development has the effect that if the planetary bolt is rotated relative to the planetary carrier, the bearing play or the prestressing of the bearing can be adjusted. If a spacer is used between the planetary bearings, the planetary bearings can be pressed against the spacer by turning the planetary bolt relative to the planetary carrier. Since the nut itself cannot rotate relative to the planetary carrier, due to the pin and recess, rotation of the planetary bolt brings about rotation of the nut relative to the planetary carrier. As a result, the distance in the axial direction between the shoulder of the planetary bolt and the contact surface of the nut changes.

A method according to the invention for assembling the above-described transmission comprises the steps:
  positioning the nut in the planetary carrier;
  positioning the planetary bearing and the planetary gearwheel on the planetary carrier;
  introducing the planetary bolt;
  rotating the nut and the planetary bolt relative to one another; and
  fixing the planetary bolt into the planetary carrier, The nut is positioned in the planetary carrier in such manner that the nut can be screwed onto the external thread of the planetary bolt after the planetary bolt has been introduced into the planetary carrier. The planetary bearings and the planetary gearwheel are positioned in such manner that when introduced into the planetary carrier, the planetary bolt is also introduced into the planetary bearings. This can be done when the bolt seat of the planetary carrier and the inner rings of the planetary bearings are aligned and the planetary bearings are located axially between the bolt seats.

The planetary bolts can be fixed into the planetary carrier by customary means. For example, the planetary bolts can be shrink-fitted into the planetary carrier. Alternatively or in addition, the planetary bolts can be fixed into the planetary carrier by means of retaining rings.

In a preferred further development, the method is suitable for use with the above-described transmission further developed with at least one pin and at least one recess. In this case the nut is positioned in the planetary carrier in such manner that the pin engages in the recess. This makes it possible to adjust the bearing play, the prestressing or the bracing of the planetary bearing by rotating the planetary bolt relative to the planetary carrier.

Preferably, the individual method steps are carried out in the sequence described above. Any desired sequences of the implementation steps that deviate therefrom are possible, unless otherwise indicated by the description above.

BRIEF DESCRIPTION OF THE DRAWINGS

Preferred example embodiments of the invention are illustrated in the figures, in which the same indexes are used for the same or functionally equivalent features. In detail, the figures show.

DETAILED DESCRIPTION OF THE PREFERRED EMBODIMENTS

Figure 1:
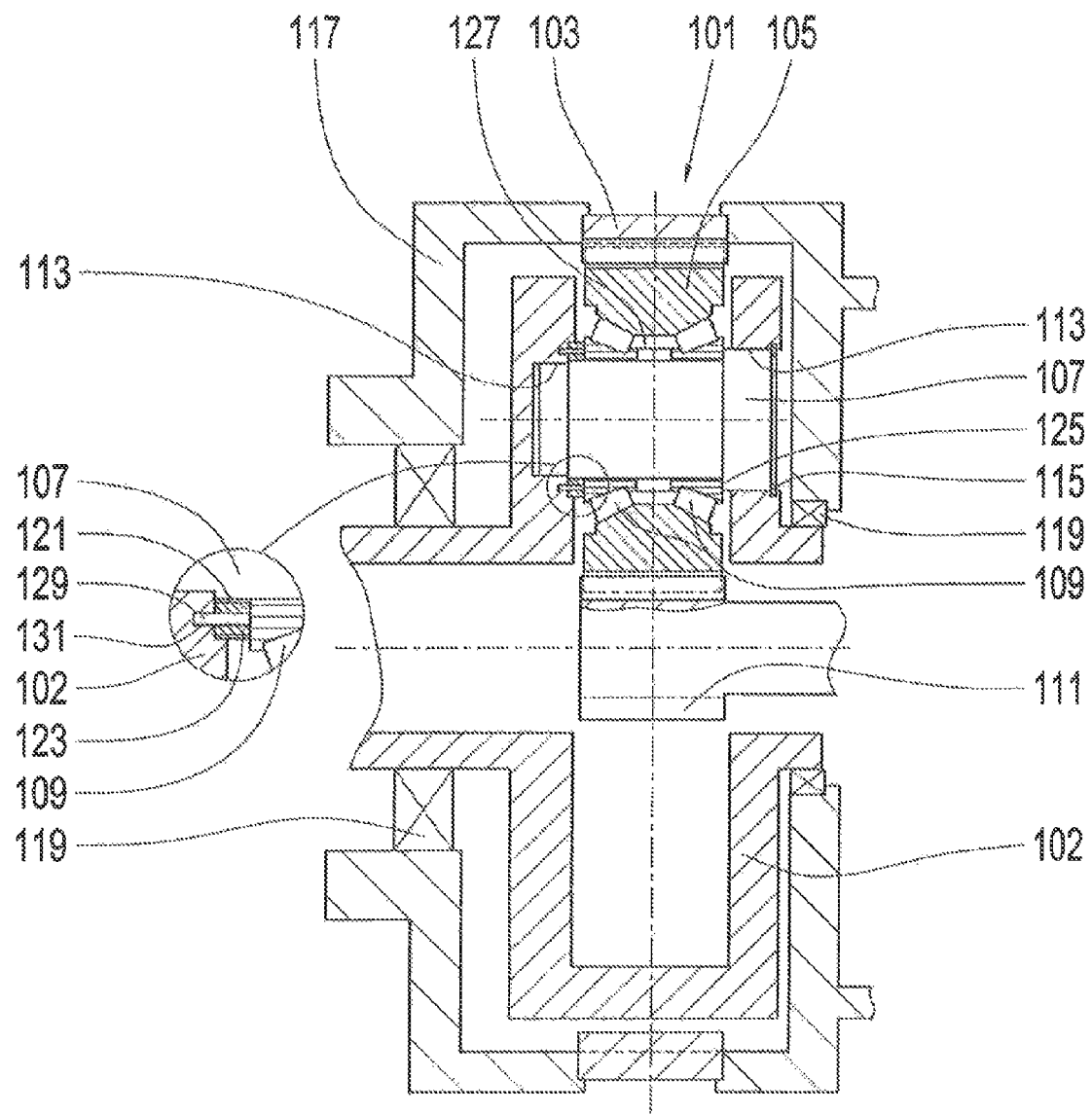
FIG. 1: A planetary transmission.

The planetary transmission 101 shown in FIG. 1 comprises a planetary carrier 102, a ring gear 103, a planetary gearwheel 105, a planetary bolt 107, planetary bearings 109 and a sun gear 111. Inner rings of the planetary bearings 109 are pushed onto the planetary bolt 107. Outer running surfaces of the planetary bearings 109 are formed by the planetary gearwheel 105. The planetary gearwheel 105 and the outer rings of the planetary bearings 109 are thus made integrally. By virtue of the arrangement described, the planetary gearwheel 105 is mounted so that it can rotate on the planetary bolt 107.

The planetary carrier 102 comprises bolt seats 113, which fix the planetary bolt 107 with interlock in the radial direction. Furthermore, the planetary bolt 107 can be fixed in the axial direction by friction force, by means of a shrink fit in the bolt seats 113. In addition, in the example embodiment shown a retaining ring 115 is provided, which ensures an interlocked fixing of the planetary bolt 107 in the axial direction.

The ring gear 103 is integrated in a transmission housing 117. In this case the ring gear 103 is fixed solidly in the transmission housing 117, Le, without the possibility of any relative movement and in particular in a rotationally fixed manner.

In contrast, the planetary carrier 102 is held in the transmission housing 117 so that it can rotate by virtue of two bearings 119. The sun gear 111 as well is designed to rotate relative to the transmission housing 117.

The planetary bolt 107 has an outer thread 121. Onto this is screwed a nut 123, Opposite the nut, the planetary bolt 107 forms a shoulder 125. The planetary bearings 109 are located axially between the nut 123 and the shoulder 125. Between the planetary bearings 109, in turn, there is a spacer 127. This determines a minimum distance of the inner rings of the planetary bearings 109 from one another. Since the planetary bearings 109 are braced between the nut 123 and the shoulder 125, a defined bearing play is set. For this, the inner rings of the planetary bearings 109 are pressed against the spacer 127.

The nut 123 is provided with pins 129, Corresponding bores 131 in the planetary carrier 102 receive the pins 129. In this way the nut 123 is rotationally fixed relative to the planetary carrier 102.

Figure 2A:
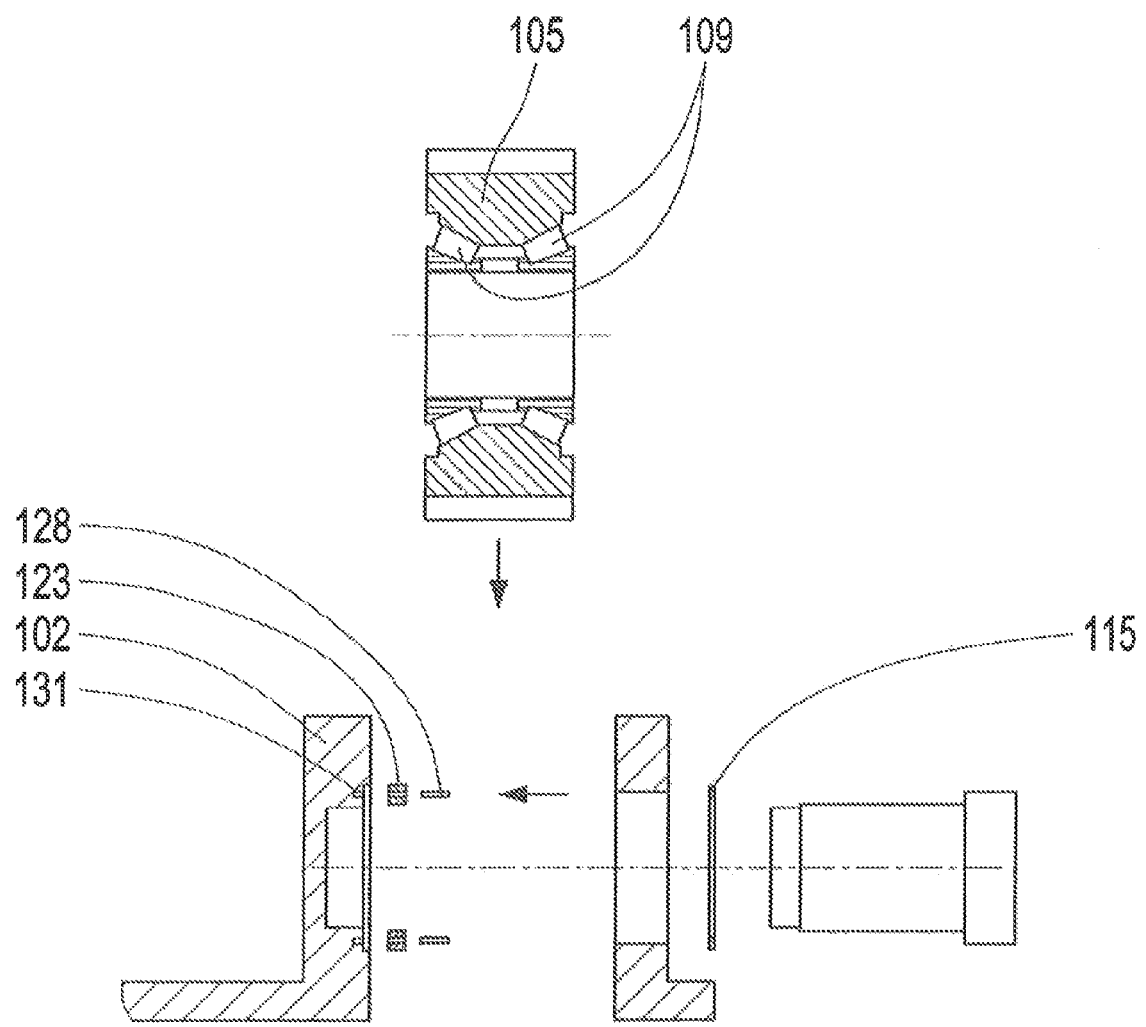
FIGS. 2a to 2c: A method for assembling the transmission.
Figure 2B:
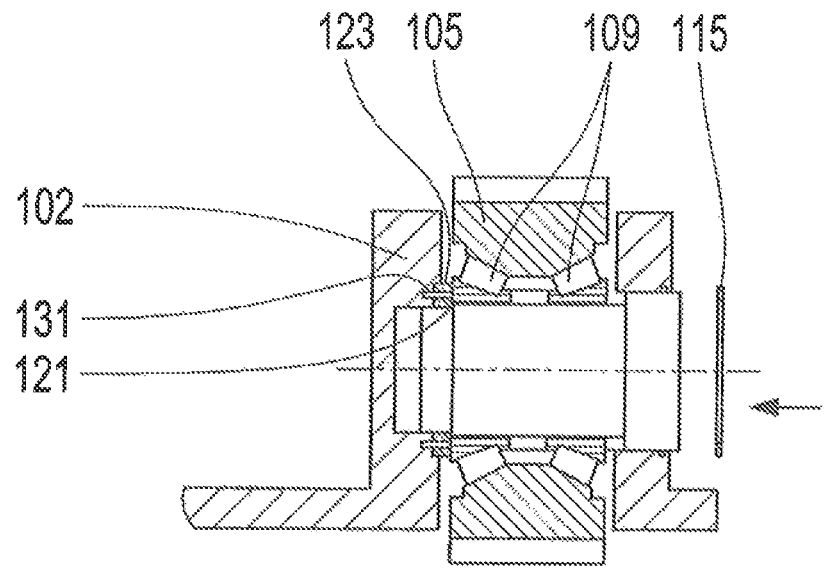
Figure 2C:
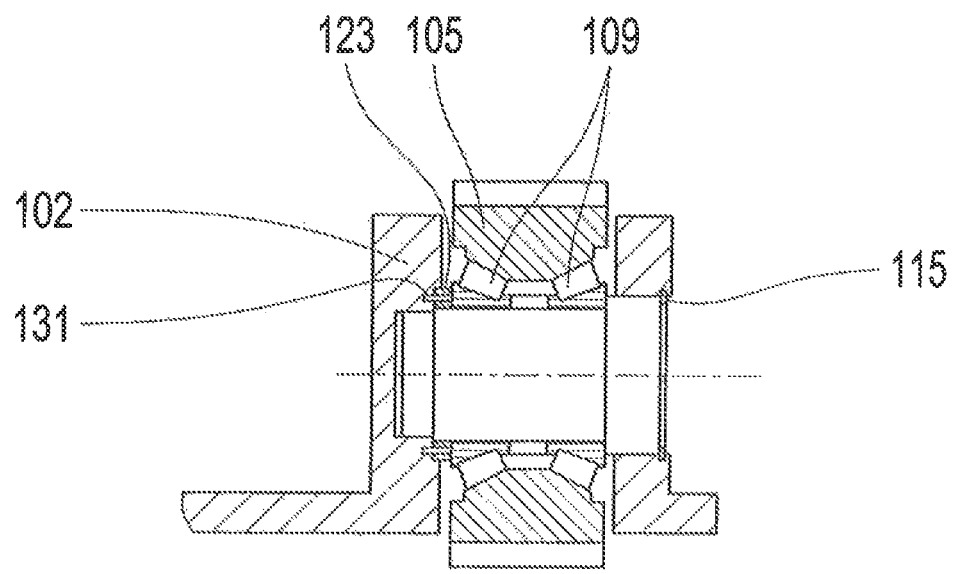

FIGS. 2a to 2c make clear the assembly method of the transmission 101. In a first step illustrated in FIG. 2a, the nut 123 is positioned in the planetary carrier 102. To receive the pins 129, the nut 123 has through-going bores. After its insertion the nut is turned so that the bores of the nut are aligned with the bores 131 in the planetary carrier so that the pins 129 can be inserted.

Then, the planetary bearings 109 are introduced together with the planetary gearwheel 105 into the planetary carrier 102 and positioned in such manner that the planetary bolt 107 can be fitted.

The planetary bolt 107 is inserted into the planetary carrier 102 far enough for the nut 123 to be in contact with the external thread 121 of the planetary bolt 107. This is shown in FIG. 2b.

Now, the external thread 121 is screwed into the nut 123 by rotating the planetary bolt 107. During this, the pins 129 prevent the net 123 from rotating.

Finally, the retaining ring 115 can be fitted into a groove of the planetary carrier 102 provided for that purpose. This is shown in FIG. 2c.

INDEXES

101 Planetary transmission
102 Planetary carrier
103 Ring gear
105 Planetary gearwheel
107 Planetary bolt
109 Planetary bearings
111 Sun gear
113 Bolt seat
115 Retaining ring
117 Transmission housing
119 Bearing
121 External thread
123 Nut
125 Shoulder
127 Spacer
129 Pin
131 Bore

The invention claimed is:

1. A transmission (101) comprising at least one planetary carrier (102), at least one ring gear (103), at least one planetary gearwheel (105), at least one planetary bolt (107), at least one planetary bearing (109) and at least one sun gear (111);
the planetary bolt (107) being fixed into the planetary carrier (102);
the planetary gearwheel (105) being mounted to rotate on the planetary bolt (107) by the at least one planetary bearing (109);
the planetary gearwheel (105) meshing with at least one of the ring gear (103) and the sun gear (111);
at least one nut (123) such that the at least one nut (123) screws onto an external thread (121) of the planetary bolt (107); and
the at least one planetary bearing (109) being axially fixed by the nut (123) and a shoulder (125) of the planetary bolt (107), and the at least one planetary bearing axially abutting the nut and the shoulder of the planetary bolt.

2. The transmission according to claim 1, further comprising at least one pin (129) and at least one recess (131), the at least one pin (129) engages in the recess (131) so that the nut (123) is secured against rotation relative to the planetary carrier (102), and either:
the nut (123) contains the pin (129) and the planetary carrier (102) contains the recess, or
the nut (123) contains the recess (131) and the planetary carrier(102) contains the pin (129).

3. A method for assembling a transmission (101) having at least one planetary carrier (102), at least one ring gear (103), at least one planetary gearwheel (105), at least one planetary bolt (107), one or more planetary bearings (109) and at least one sun gear (111), the planetary bolt (107) is fixed into the planetary carrier (102), the planetary gearwheel (105) is mounted to rotate on the planetary bolt (107) by the planetary bearing (109), the planetary gearwheel (105) meshes with at least one of the ring gear (103) and the sun gear (111), at least one nut (123) such that the at least one nut (123) screws onto an external thread (121) of the planetary bolt (107), and the planetary bearings (109) are axially fixed by the nut (123) and a shoulder (125) of the planetary bolt (107), and at least one pin (129) and at least one recess (131), the pin (129) engages in the recess (131) so that the nut (123) is secured against rotation relative to the planetary carrier (102), and either the nut (123) contains the pin (129) and the planetary carrier (102) contains the recess; or the nut (123) contains the recess (131) and the planetary carrier(102) contains the pin (129), the method comprising:
positioning the nut (123);
positioning the planetary bearing (109) and the planetary gearwheel (105);
introducing the planetary bolt (107);
rotating the nut (123) and the planetary bolt (107) relative to one another; and
fixing the planetary bolt (107) into the planetary carrier (102).

4. The method according to claim 3, further comprising positioning the nut (123) in the planetary carrier (102) in such a manner that the pin (129) engages in the recess (131) so that by rotating the planetary bolt (107) relative to the planetary carrier (102), the nut (123) and the planetary bolt (107) rotate relative to one another.

5. A transmission comprising at least one planetary carrier, at least one ring gear, at least one planetary gearwheel, at least one planetary bolt, at least one planetary bearing and at least one sun gear;
the planetary carrier having at least one bolt seat which receives a first axial end of the planetary bolt such that the planetary bolt being rotationally and axially fixed with respect to the planetary carrier, the planetary carrier supporting planetary bearings which support the planetary gearwheel such that the planetary gearwheel being rotatable with respect to the planetary bolt and the planetary carrier;
the planetary gearwheel meshing with at least one of the ring gear and the sun gear; and
the planetary carrier comprising recesses, each of the recesses receives a pin that mates with a nut, the nuts abut an axial side surface of the planetary bearings such that the planetary bearings being axially fixed along the planetary bolt between the nuts and a shoulder of the planetary bolt on a second axial end thereof.

* * * * *